United States Patent [19]

Russell et al.

[11] 4,047,439
[45] Sept. 13, 1977

[54] MAGNETIC LIQUID SUPPORTED LINEAR ACCELEROMETER

[76] Inventors: Michael King Russell, Lynworth House, Prestbury, Cheltenham; Anthony William Russell, The Bittams, Crippetts Road, Leckhampton, Cheltenham, both of England

[21] Appl. No.: 658,866

[22] Filed: Feb. 17, 1976

[30] Foreign Application Priority Data

Mar. 26, 1975 United Kingdom ............... 12568/75

[51] Int. Cl.² .............................................. G01P 15/08
[52] U.S. Cl. ................................. 73/516 R; 73/517 B; 308/10
[58] Field of Search ......... 73/516 R, 516 LM, 517 B, 73/71.2; 308/10; 74/5 R

[56] References Cited

U.S. PATENT DOCUMENTS

| | | | |
|---|---|---|---|
| 2,797,912 | 7/1957 | Trostler | 73/516 R |
| 3,488,531 | 1/1970 | Rosensweig | 308/10 X |
| 3,530,727 | 9/1970 | Albert | 73/516 R |
| 3,734,578 | 5/1973 | Rosensweig | 308/10 |

Primary Examiner—James J. Gill
Attorney, Agent, or Firm—Young & Thompson

[57] ABSTRACT

A linear accelerometer comprises a proof mass in the form of a permanent bar magnet located in a tube containing a magnetic fluid such as a liquid with particles of magnetic material suspended therein. A servo circuit responsive to A.C. energized sensing coils is used to energize a D.C. electromagnet to maintain the proof mass in a central position in the tube.

3 Claims, 2 Drawing Figures

MAGNETIC LIQUID SUPPORTED LINEAR ACCELEROMETER

FIELD OF THE INVENTION

This invention relates to linear accelerometers and is particularly concerned with the provision of an accelerometer which is very rugged and resistant to mechanical shock.

SUMMARY OF THE INVENTION

According to the invention, there is provided a linear accelerometer having a proof mass comprising a permanent bar magnet located in a magnetic fluid, servo means responsive to movement of the bar magnet in the direction of the axis thereof for maintaining the bar magnet in a desired position and means for providing an electrical signal indicative of the force exerted on the bar magnet by the servo means.

The servo means may comprise a pair of sensing coils symmetrically disposed with respect to the desired position of the proof mass magnet and connected in a bridge circuit, and means responsive to the out-of-balance voltage from the bridge circuit for energising a D.C. electromagnet in order to apply a force to the proof mass magnet to urge it towards the desired position.

The magnetic fluid may comprise a liquid such as an oil having particles of magnetic material suspended therein. The effect of the proof mass magnet, on the magnetic fluid is that, although there is no static resistance to movement of the proof mass magnet the fluid behaves as a liquid with a very high viscosity. In addition, the proof mass magnet positions itself so that the reluctance of the magnetic field between its poles per unit angle around its axis is substantially uniform. Thus, in order to maintain the bar magnet in a desired orientation, the magnetic liquid is preferably contained in an elongate chamber of cross-sectional width substantially less than its length. The proof mass magnet positions itself with its axis coincident with that of the elongate chamber so that the thickness of the layer of magnetic fluid between the sides of the bar magnet and the side walls of the chamber is substantially uniform.

BRIEF DESCRIPTION OF THE DRAWINGS

An accelerometer in accordance with the invention will now be described by way of example with reference to the accompanying drawing, in which.

DESCRIPTION OF THE PREFERRED EMBODIMENT

Figure 1:
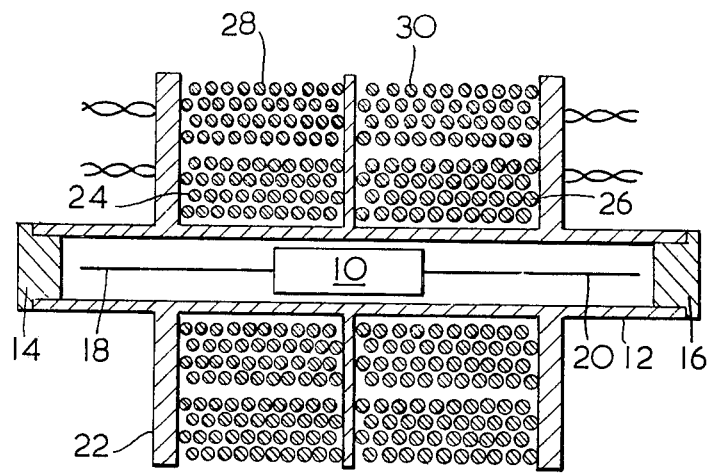
FIG. 1 is a cross-sectional view of the sensor of an accelerometer in accordance with the invention.

Referring to FIG. 1, a sensor for an accelerometer has a proof mass comprising a cylindrical bar magnet 10 positioned within a cylindrical tube 12 which has its ends closed by respective stoppers 14 and 16 and is filled with magnetic fluid comprising an oil having particles of magnetic material suspended thereon. Because of the nature of the fluid, the magnet 10 is suspended within the fluid away from the sides of the tube 12 with its longitudinal axis parallel to that of the bore. Respective rods or straight wires 18 and 20 project axially from each end of the bar magnet 10. The overall length of the bar magnet 10 and the two rods or wires 18 and 20 is a little less than the internal length of the tube 12. Thus the rods or wires act as end stops, engaging with the stoppers 14 and 16 if the displacement of the magnet becomes excessive.

The outer surface of the tube 12 forms the spindle of a bobbin 22 having two axially spaced sections each of which contains two coils. The radially inner coils 24 and 26 are forcing coils and the radially outer coils 28 and 30 are sensing coils.

Figure 2:
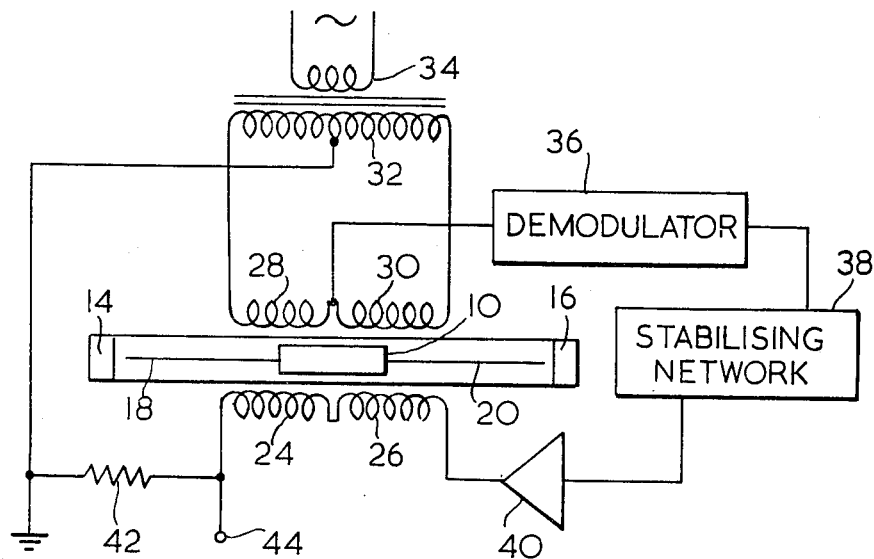
FIG. 2 is a diagram of an electrical circuit for use with the sensor shown in FIG. 1.

Referring to FIG. 2, the sensing coils 28 and 30 are connected to form two of the arms of an inductance bridge, the other two arms being formed by the centre tapped secondary 32 of a transformer which has its primary 34 connected to a 1 kHz alternating current supply. The inductance bridge produces an out-of-balance voltage if the magnet 10 is not symmetrically disposed with respect to the sensing coils. This voltage is applied to a demodulator 36 to provide a direct current output proportional thereto. The output of the demodulator is applied via a stabilising network 38, which may take the form of a low-pass filter, and a high-gain amplifier 40 to the forcing coils 24 and 26 which are connected in series with a resistance 42 and wound in such a way that their axial fields are in opposition. The direction of the current applied to the forcing coils 24 and 36 is such that the bar magnet 10 is driven towards the bridge null position in which it is symmetrically disposed with respect to the two sensing coils 28 and 30. The potential difference across the resistance 42 is measured at a terminal 44. Since the axial balancing force on the magnet 10 is proportional to the current through the forcing coils 24 and 26, the voltage on the terminal 44 is proportional to the external axial balancing force acting on the magnet 10.

Since the sensing current is an alternating current and the forcing current is a direct current, it is possible to use common coils to perform both the function of the sensing coils and that of the forcing coils.

With the suspension of the proof mass as described, static resistance to movement thereof is very small while at the same time, the viscous drag resistance is large. Careful winding and matching of the sensing coils enables the sensed null position to be made coincident with the physical centre of the bore. The proof mass spring constant at this position is very small.

We claim:

1. A linear accelerometer having a proof mass comprising a permanent bar magnet located in an elongate chamber of length in the direction of its longitudinal axis substantially greater than its width in directions perpendicular to said longitudinal axis and substantially filled with a magnetic fluid, the bar magnet being supported by the magnetic fluid with the magnetic axis of the bar magnet parallel to the longitudinal axis of the chamber, servo means responsive to movement of the bar magnet in the direction of the axis thereof for maintaining the bar magnet in a desired position and means for providing an electrical signal indicative of the force exerted on the bar magnet by the servo means.

2. A linear accelerometer according to claim 1, wherein the servo means comprises a pair of sensing coils symmetrically disposed with respect to the desired position of the proof mass magnet and connected in a bridge circuit, and means responsive to the out-of-balance voltage from the bridge circuit for energising a D.C. electromagnet in order to apply a force to the proof mass magnet to urge it towards the desired position.

3. A linear accelerometer according to claim 2, in which the bridge circuit is an inductance bridge and the means responsive to the out-of-balance voltage therefrom comprises a demodulator arranged to produce a D.C. output to drive the electromagnet.

* * * * *